United States Patent

Jenny

[15] 3,670,996
[45] June 20, 1972

[54] LANDING GEAR GRAVEL AND WATER DEFLECTOR

[72] Inventor: Robert W. Jenny, Bellevue, Wash.
[73] Assignee: The Boeing Company, Seattle, Wash.
[22] Filed: Oct. 20, 1969
[21] Appl. No.: 867,473

[52] U.S. Cl. ............................................244/103, 280/157
[51] Int. Cl. ....................................................B64c 25/32
[58] Field of Search ..........................244/103, 102, 100, 53; 280/156, 157, 159, 152.05, 152, 150, 154.5

[56] References Cited

UNITED STATES PATENTS

| 877,083 | 1/1908 | Ingleby | 280/159 |
| 1,446,531 | 2/1923 | Williams, Jr. | 244/103 |
| 1,914,092 | 6/1933 | Henrichsen et al. | 244/103 X |
| 2,814,454 | 11/1957 | Atkins et al. | 244/53 X |
| 3,169,001 | 2/1965 | Horne | 244/103 |

Primary Examiner—Milton Buchler
Assistant Examiner—Paul E. Sauberer
Attorney—Glenn Orlob and Nicolaas De Vogel

[57] ABSTRACT

A gravel and water deflector plate for preventing gravel and water, which is energized into motion during operation of the landing gear, from damaging other airplane parts. The plate is mounted in a horizontal plane and surrounds the wheel adjacent the ground or runway. The plate extends in all horizontal directions from the wheel for distances which are sufficient to intercept the upthrown gravel trajectories.

In addition, the deflector plate may be a separate operational element or may also be utilized as a closing door for the landing gear well during flight.

12 Claims, 5 Drawing Figures

PATENTED JUN 20 1972 3,670,996
Fig. 1.
Fig. 2.
Fig. 3.
Fig. 4.
Fig. 5.
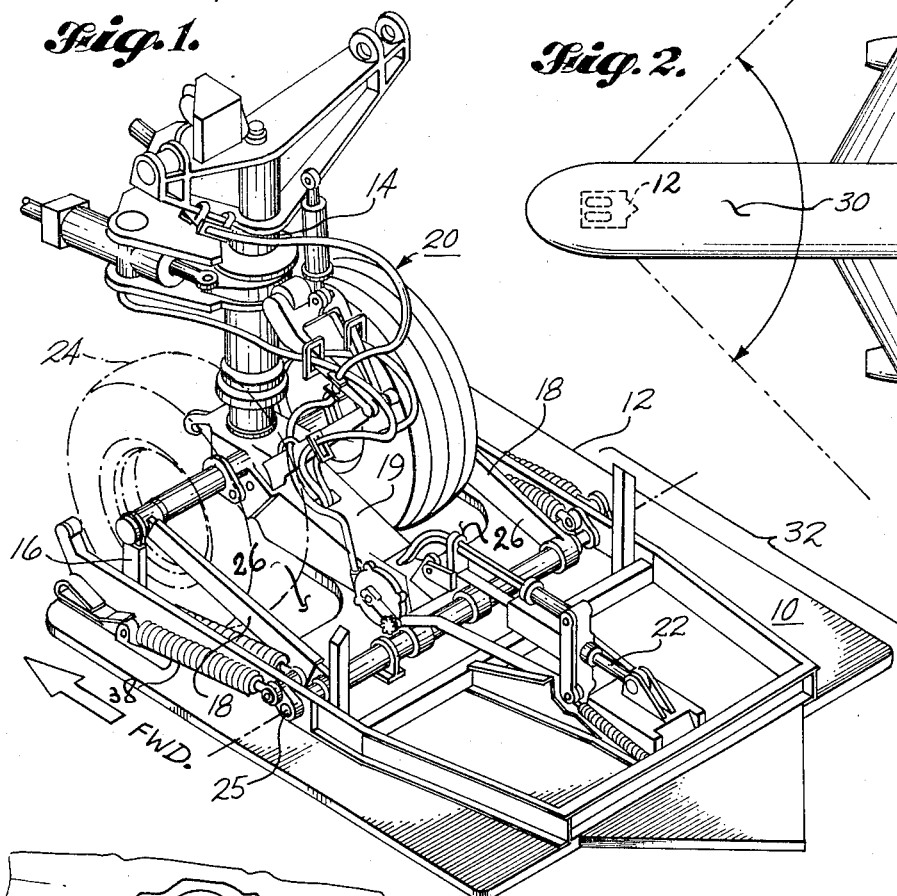
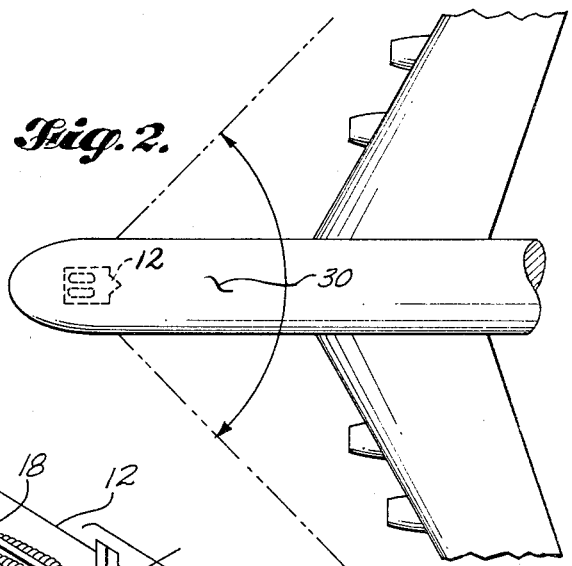
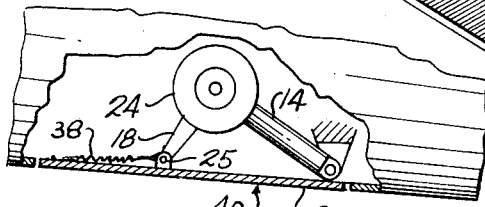
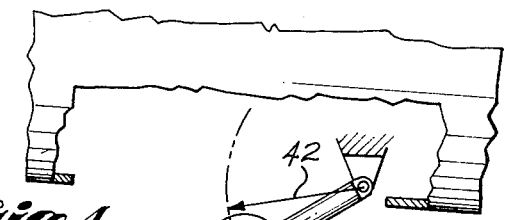
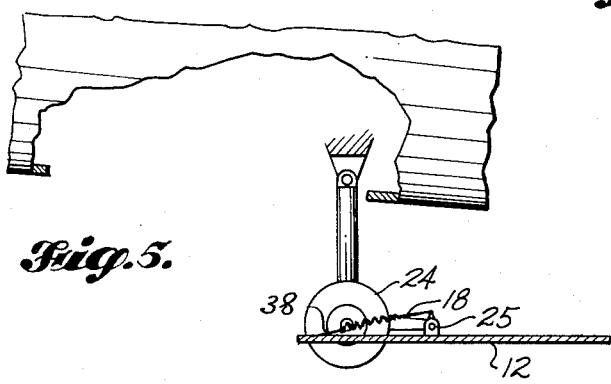
INVENTOR.
ROBERT W. JENNY
BY
AGENT

LANDING GEAR GRAVEL AND WATER DEFLECTOR

BACKGROUND OF THE INVENTION

1. Field of the Invention

This invention relates to gravel and water deflector means for aircraft landing gears and more particularly to a horizontally mounted plate surrounding the rotating wheel for deflecting gravel, etc. away from engine intakes, leading edge flaps, etc.

2. Description of the Prior Art

The disclosed invention prevents damage to an aircraft by suppressing or deflecting gravel, mud, water, etc., which is thrown upwards from the runway by rotation of the landing gear wheel. More specifically, and as illustrated in the accompanying drawings, its preferred configuration, being an actual reduction to practice, comprises a horizontal deflector mounted so as to be actuated together with a double wheel landing gear surrounding the wheels as closely as possible considering horizontal tire deflections, and as close to the ground as rut depth, vertical deflection of the tire, load-carrying capability of the deflector, and flexibility in its mounting will allow. An alternate arrangement is to have mounting and actuation of the deflector completely independent of the landing gear. Furthermore, the possibility exists of using the deflector as a nose wheel door with the regular doors removed and the use of special vanes and/or shapes to control the dust stirred up by the nose wheel.

Various types of gravel or mud deflectors or suppressing devices have been used in the prior art. However, since the aircraft technology has progressed at a rapid speed, it is not strange and very logical that these earlier devices do not suffice.

The present invention applies in particular to the newest existing airplanes of today and the future airplanes. Therefore, no patent was uncovered during the patent search which discloses or suggests the particular arrangement of the herein disclosed aircraft gravel and water deflector.

A wheel housing, which encloses most of the landing gear wheels and has a streamlined shaped construction is disclosed in a U.S. Pat. No. 1,446,531, by J. M. WILLIAMS, Jr. However, Williams' non-steerable, non-retractable and non-gravel deflecting structure does not provide efficient protection for present day jet aircraft.

In a U.S. Pat. No. 3,169,001, to HORNE a horizontally mounted deflector plate between a double wheel aircraft landing gear is disclosed. Here again no efficient gravel deflection is obtained. However, the device may be useful as far as aircraft operation is concerned on runways covered with slush or standing water.

With respect to a wheel fairing serving as a wheel door, note the U.S. Pat. No. 2,388,365 to N. PALLEY. The wheel door closure and fairing of Palley has no gravel deflection qualities and its retracting operation and arrangement by pivoting inboard is different compared to the present invention, as explained hereinafter.

SUMMARY OF THE INVENTION

Aircraft which are used on specific routes into areas where normal runways are not existent, such as in far-off regions in mountainous Alaska, Africa, Northpole, etc. are experiencing damage to the fuselage and engines by the rough rock or gravel runways.

The damage to engines, in particular, where jet engines are concerned has been very serious, since the engine vortex, as well as the front wheel rotation action, both throw rocks, gravel, etc., into the jet engine intakes. Therefore, jet engines used on gravel runways should be equipped with implementations which prevent the damaging rock and gravel throw-up effects.

The vortex prevention can be diminished by a system as disclosed in a pending U.S. Pat. Ser. No. 821,427, applied for by the present Assignee. The landing gear harmfully producing gravel and water actions can be diminished by the present invention which has been tested thoroughly and is presently used on various aircraft.

During extensive tests, motion pictures of wheel running in gravel revealed on particular and basically significant factor regarding control of the gravel spray: The energy is imparted to the gravel while it is in close contact with the tire, but the gravel doesn't move much until the wheel has moved at least 2 feet (approx. wheel diameter). The practical implication is that reasonably full control of the gravel trajectory cannot be achieved unless (1) a way can be found to minimize the energy transmitted to the gravel (soft tires?), or (2) the guides, deflectors, etc. intercept gravel trajectories two or more feet away from the wheels.

Ideally, the deflector could be smallest in area if it continually slid on the gravel; however, it would then accelerate gravel forward and this gravel would cause trouble.

In addition, the deflector should serve also as a wheel door, with the regular doors removed. An alternate is deflector-mounting and actuation completely independent of the landing gear except that the deflector will engage the gear on extension to coordinate its position with wheel position. The deflector should have to allow clearance for wheel steering, but an auxiliary deflector on the inner cylinder may cover this gap.

Special vanes and/or shapes of the deflector could be incorporated for controlling the dust stirred up by the nose wheel.

Thus, it is the object of the present invention to provide for a means which prevents damaging an aircraft by gravel when operated on gravel runways It is another object of the present invention to provide for a horizontal control equipment used in coordination with an aircraft landing gear for suppressing and deflecting gravel and water.

With the foregoing and other objects in view the invention has further reference to certain features of accomplishment which will become apparent as the description proceeds, taken in connection with the accompanying drawings described hereinafter.

IN THE DRAWINGS

FIG. 1 reveals an isometric drawing of the nose gear in extended position and the gravel deflector as actually used in its preferred shape and arrangement on aircraft.

FIG. 2 shows in sketch form the major effective protected area and location of the gravel deflector arrangement illustrated by FIG. 1.

FIG. 3 is a sectional view of the gravel deflector in retracted position thereby functioning as wheel well door.

FIG. 4 is a sectional view of the gravel deflector in a midway lowered landing gear position.

FIG. 5 is a sectional view of the gravel deflector in a full extended position as shown isometrically in FIG. 1.

DESCRIPTION OF THE PREFERRED EMBODIMENT

A preferred and actual existing construction of the aircraft landing gear gravel and water deflector is illustrated in its operational stage in FIG. 1. The deflector 10 comprises a flat somewhat rectangular shaped panel 12 which is hingedly attached to the wheel strut 14 and kept in a substantial horizontal position by a stop member 16 and supporting lever arm 18.

A hydraulic, electric, pneumatic, or other power actuating means 20 is connected between the support arms 18 and 19 and the locking means 22 for operating the panel from the aircraft fuselage wheel well out into landing position, as shown in FIG. 1.

The panel 12 has a certain size which has been calculated to by roughly three or more wheel 24 diameters long in the aircraft aft direction and which projects forward and to each side of a wheel for a short distance, being approximately the width of the wheel 24. The exact dimensions cannot be given, since for each different airplane certain variations exist, including parameters such as different wheel diameter, landing speed, weight, etc.

In general, the panel 12 will be positioned as close to the runway as possibly feasible so that the panel 12 is efficient in intercepting the up-stirred gravel trajectories and deflect the gravel toward harmless areas and in particular away from the aircraft jet inlets.

The arrows in FIG. 2 form an angle 30 which is to be free from gravel due to the long overhang portion 32 of the panel 12, as noticed, leading edge and inlets are included in the area indicated as angle 30.

As further illustrated in FIGS. 3 to 5, the panel 12 pivots about the axis 25 as the panel 12 converts from its function as door 40 to deflector panel 12. However, during the extension maneuver the panel 12 pivots underneath the wheel 24 along an arc 42 and then positions itself about the wheels 24.

As illustrated in FIG. 1, the panel 12 is provided with two inserts or openings 26 through which the wheels will partly protrude during full deployment of the landing gear by the forward-up pivoting movement of the panel 12 about pivot point 25. The spring means 38 will keep the panel in its horizontal position and keep the panel against the stop members 16.

Thus, as illustrated and explained herein, the preferred embodiment of the present invention as applied to a nose gear on a Boeing 737 certificated for gravel runways by the FAA comprises a deflector plate pivotally mounted to the landing gear auxiliary structure and operated for positioning next to the runway and in close surrounding relationship to the landing gear wheels. Furthermore, the positioning of the plate is substantially in a horizontal plane which is below the wheel center and the plate projects in the fore, aft and side directions for a distance being sufficient for breaking up gravel trajectories energized by the landing gear wheel rotation.

Various modifications of positioning, mounting and operating of the deflector plate in combination with the landing gear movement or independent therefrom can be devised but are deemed to be alterations which are not interfering with the spirit and scope of the present invention as claimed below.

Now, therefore, I claim:

1. A gravel/water deflector for aircraft landing gear comprising in combination,
   a. a deflector plate mounted by a hinge means mechanism to said airplane landing gear strut,
   b. said hinge means mechanism adapted to move said deflector plate in a substantial horizontal position adjacent an associated runway surface during said strut lowered landing condition and to convert said deflector plate into a wheel well closure function upon said strut retracted condition.

2. A gravel water deflector for aircraft landing gear as claimed in claim 1 wherein said hinge means mechanism includes,
   a. at least one support arm, spring and stop member,
   b. a first pivot point and a second pivot point positioned at said deflector plate forward and mid portion, respectively,
   c. said support arm connected pivotally between said landing gear wheel axis and said second pivot point,
   d. a bell crank pivotally connected to said second pivot point, and
   e. said spring connected pivotally between said first pivot point and said bell crank for holding said deflector plate in a substantial horizontal position against said stop member.

3. A gravel/water deflector for aircraft landing gear as claimed in claim 2 wherein said deflector plate has a substantially rectangular configuration and is provided with at least one opening for said associated landing gear wheel.

4. A gravel/water deflector for aircraft landing gear as claimed in claim 3 wherein said deflector plate has a forward, mid and aft portion which extends from said landing gear wheel in a horizontal plane below said wheel center in a forward, aft and side direction from said wheel for a distance being sufficient to intersect wheel energized gravel trajectories.

5. A gravel/water deflector for aircraft landing gear as claimed in claim 4 wherein said deflector plate extends in the aft direction substantially for a substantially longer distance than in forward and side direction, thereby preventing energized stirred-up gravel from travelling to said aircraft associated engine intake area.

6. A gravel/water deflector for aircraft landing gear as claimed in claim 5 wherein said aft end portion of said deflector plate has a length of more than one wheel diameter.

7. A gravel/water deflector for aircraft landing gear as claimed in claim 5 wherein said length of said aft portion of said deflector plate is between one and three wheel diameters.

8. A gravel/water deflector for aircraft landing gear as claimed in claim 5 wherein said length of said aft portion of said deflector plate is about 2 feet.

9. A gravel/water deflector for aircraft landing gear as claimed in claim 5 wherein said landing gear relates to a nose wheel landing gear arrangement.

10. A gravel/water deflector for aircraft landing gear comprising in combination a deflector plate, mounted to said airplane, having a substantially horizontally disposed flat surface surrounding said landing gear wheel at a substantial horizontal plane below said wheel center and extending in forward, aft and side directions from said wheel for a distance being sufficient to intersect wheel energized gravel trajectories, and wherein said deflector plate is mounted to said airplane by pivotable hinge means driven by power means for positioning said deflector about said landing gear in said horizontal plane and for retracting and storing said deflector plate into said aircraft.

11. A gravel/water deflector for aircraft landing gear as claimed in claim 10 wherein said deflector plate in said stored position covers said landing gear during flight in retracted position so that said deflector plate performs a wheel well door function.

12. A gravel/water deflector for aircraft landing gear as claimed in claim 11 wherein said power means comprises landing gear lowering and retracting actuation means.

* * * * *